United States Patent [19]
Whitehead

[11] Patent Number: 5,969,890
[45] Date of Patent: Oct. 19, 1999

[54] ADJUSTABLE EXTERIOR REARVIEW MIRROR FOR VEHICLES

[75] Inventor: Peter J. Whitehead, Holland, Mich.

[73] Assignee: Donnelly Corporation, Holland, Mich.

[21] Appl. No.: 08/838,877

[22] Filed: Apr. 9, 1997

[51] Int. Cl.$^6$ .................................................. G02B 7/182
[52] U.S. Cl. .......................... 359/841; 359/842; 359/881; 248/480; 248/477; 248/476
[58] Field of Search .................................. 359/841, 872, 359/881; 248/480, 477, 476

[56] References Cited

U.S. PATENT DOCUMENTS

| D. 285,549 | 9/1986 | Haack | D12/187 |
|---|---|---|---|
| D. 331,216 | 11/1992 | McGouldrick | D12/187 |
| 3,118,965 | 1/1964 | Jones | 88/93 |
| 3,119,591 | 1/1964 | Malecki | 248/282 |
| 3,420,490 | 1/1969 | Malachowski | 248/486 |
| 4,135,694 | 1/1979 | Stegenga et al. | 218/478 |
| 4,315,614 | 2/1982 | Stegenga et al. | 248/479 |
| 4,730,913 | 3/1988 | Boothe | 359/841 |
| 4,793,582 | 12/1988 | Bronstein et al. | 248/486 |
| 4,815,836 | 3/1989 | Byers et al. | 359/841 |
| 4,907,871 | 3/1990 | Hou | 350/639 |
| 4,911,545 | 3/1990 | Miller | 350/604 |
| 4,921,337 | 5/1990 | Hou | 359/841 |
| 4,998,812 | 3/1991 | Hou | 359/841 |
| 5,096,283 | 3/1992 | Croteau | 359/865 |
| 5,217,197 | 6/1993 | Spitzer | 248/479 |
| 5,292,100 | 3/1994 | Byers et al. | 248/480 |
| 5,483,385 | 1/1996 | Boddy | 359/841 |
| 5,489,080 | 2/1996 | Allen | 248/480 |
| 5,513,048 | 4/1996 | Chen | 359/881 |
| 5,546,239 | 8/1996 | Lewis | 359/855 |
| 5,572,376 | 11/1996 | Pace | 359/877 |

FOREIGN PATENT DOCUMENTS

2013178   9/1990   Canada .

Primary Examiner—Cassandra Spyrou
Assistant Examiner—Mohammad Y. Sikder
Attorney, Agent, or Firm—Van Dyke, Gardner, Linn & Burkhart, LLP

[57] ABSTRACT

A vehicle exterior rearview mirror assembly, especially suited for vehicles used for towing trailers, which selectively holds a mirror subassembly in one of a plurality of positions along a mounting arm to provide at least an inboard, non-towing position and an outboard, towing position. The vehicle exterior rearview mirror assembly includes the mirror subassembly, which includes a housing and a reflective element supported in the housing, a mounting bracket adapted for mounting to a vehicle, and a support for mounting the mirror subassembly to the mounting bracket. The support includes a pair of arms which cooperate with the housing to support the mirror subassembly in one of two or more extended positions from the mounting bracket.

50 Claims, 7 Drawing Sheets

ADJUSTABLE EXTERIOR REARVIEW MIRROR FOR VEHICLES

TECHNICAL FIELD AND BACKGROUND OF THE INVENTION

The present invention relates to an exterior rearview mirror for mounting on a vehicle and, more particularly, to an extendable exterior rearview mirror for mounting on a vehicle which can be extended to a position spaced farther outboard and away from the vehicle body than the normal mirror viewing position when the vehicle is used for towing a trailer, camper, another vehicle, or the like.

Conventional towing mirrors include a mirror subassembly that is mounted to the body of a vehicle by a support and mounting bracket. The support positions the mirror subassembly at a fixed distance from the body of the vehicle which is farther than the position of conventional exterior rearview mirrors in order to provide an unobstructed view to the rear of the towed object. For example, U.S. Pat. No. 3,119,591 to A. J. Malecki discloses a rigid support for eccentrically mounting a mirror assembly to a vehicle in a fixed extended position. Naturally, these fixed extended rearview mirror assemblies increase the width of the vehicle. In some vehicles, the width is increased beyond the maximum width allowed by conventional vehicle transport trucks which deliver the vehicles to the dealership. Therefore, these mirror assemblies are typically installed at the dealership, which ultimately increases the cost of the vehicle.

In addition, use of the prior known fixed, extended rearview mirror assemblies is also inconvenient for the driver who only occasionally tows a trailer. Since such mirror assemblies substantially increase the width of the vehicle, they hamper normal maneuvering through passages, such as those defined by garage door openings, drive through banking structures, and the like. Furthermore, they are more vulnerable to being damaged or causing damage than conventional exterior rearview mirrors, especially when used by an inexperienced driver. This inconvenience is compounded by the fact that, not only do these extended rearview mirrors generally detract from the appearance of the vehicle, they increase the cost of the vehicle.

In response to the needs of the drivers who only occasionally tow objects, several extendible mirror assemblies have been developed. For example, in U.S. Pat. Nos. 5,513, 048 and 5,489,080, each disclose mirrors supported on telescoping tubular members which are fixed in position by threaded fasteners. Though simple in construction, these telescoping members typically require the operator to use a tool to adjust the position of the mirror. Moreover, they tend to increase the vibration of the mirror assembly, which may in turn loosen the connection between the telescoping members of the mirror assembly, especially when the mirror assembly is in the outboard position.

In U.S. Pat. No. 5,546,239 to Lewis, an extendable mirror element is disclosed in which the mirror element is extended from the mirror casing to an outboard position. Again, the mounting bracketry lacks the structure to perform well in vibration. Furthermore, the mirror element is more vulnerable to damage.

In contrast, U.S. Pat. No. 5,572,376 to Pace discloses an extensible vehicle mirror which includes a rack and pinion drive system and drive motor to translate a mirror longitudinally along the mirror support arm. As a result, Pace's mirror assembly is relatively complicated and the associated parts increase the weight of the mirror assembly significantly. The more parts that require assembling, the greater the costs of manufacture. Moreover, weight increases of this magnitude tend to increase the vibration of the mirror assembly and degrade the performance of the mirror.

Consequently, there is a need for an extendable exterior rearview mirror that can be installed at the factory, which provides the extended field of view required when towing vehicles and yet can be manually retracted to a normal operating position where it does not hamper the maneuverability of the vehicle. Moreover, the extendable rearview mirror should have minimal impact on the vibration of the mirror assembly and be relatively easy to adjust between non-towing and towing positions without the need for tools.

SUMMARY OF THE INVENTION

Accordingly, the present invention provides an improved exterior rearview mirror assembly, especially suited for towing vehicles, which is adjustable between at least a retracted position for normal, non-towing use and an extended position in which the mirror assembly is outboard of its normal position allowing an increased field of view rearward of a towed trailer or the like. This function is provided by a pair of arms that are adapted to hold the mirror subassembly in one of at least two positions along the arms.

According to one aspect of the invention, an exterior rearview mirror assembly includes a mirror subassembly, a support for supporting the mirror subassembly, and a mounting bracket which mounts the support and mirror subassembly to a vehicle. The support includes a pair of arms, which cooperate with the housing of the mirror subassembly to support the mirror subassembly in one of two or more extended positions from the mounting bracket.

In one form, at least one of arms includes an engaging member cooperating with the housing to selectively hold the mirror subassembly in one of the towing and non-towing positions. Preferably, the engaging member comprises a stop, such as a retractable stop.

In other aspects, the housing includes at least two positioning members, with one of the positioning members corresponding to the towing position and the other of the positioning members corresponding to the non-towing position. In this aspect, one of the pair of arms cooperates with at least one of the positioning members to hold the mirror subassembly in one of the towing and non-towing positions. Preferably, at least one of the arms includes an engaging member for selectively engaging one of the positioning members to releasably fix the position of the mirror subassembly in one of the non-towing and towing positions. The engaging member may comprise a retractable stop and, further, may include a spring to bias the retractable stop into engagement with one of the positioning members when the positioning member is aligned with the retractable stop. Furthermore, the positioning members may comprise openings.

In a preferred aspect, the housing may include a pair of rails, a first of the rails being positioned on an upper wall of the housing and a second of the rails being position on a lower wall of the housing. The arms engage the rails to slidingly hold the mirror subassembly therebetween. The rail on the lower wall preferably includes a web and a flange, with the lower arm releasably engaging either the web or the flange to hold the mirror subassembly in one of the towing and non-towing positions.

In yet other aspects, the housing includes at least one positioning member, and one of the arms includes an engaging member for engaging the positioning member, where the engaging member preferably comprises a projecting member. The projecting member may include camming surfaces. The positioning member preferably comprises a recess, and the recess may similarly include camming surfaces. In this manner, when a pulling force is applied to the mirror subassembly the respective camming surfaces of the projecting member and the recess disengage the projecting structure from the recess and permit the repositioning of the mirror subassembly along the support. In further aspects, the lower wall and the upper wall of the housing each include an elongate groove in which arms are seated so that when the mirror subassembly is moved between the towing position and the non-towing position the arms slide along the elongate grooves. Preferably, the recess of the housing is aligned in one of the elongate grooves.

According to another aspect of the invention, a vehicle exterior rearview mirror assembly includes a mirror subassembly having a housing and a reflective assembly supported by the housing. The housing is generally cup-shaped with a central opening and an outer wall, with the outer wall including upper and lower rails. A support, which mounts the mirror subassembly to a mounting bracket, includes a C-shaped mounting arm having upper and lower arm members. The upper rail of the housing extends into the upper arm to guide the housing along the upper arm, and the lower rail extends into and is supported in the lower arm member. One of the upper and lower arm members releasably holds the position of the mirror subassembly along the support in one of an inboard position and an outboard position, where the outboard position provides an extended rearward view of the vehicle.

Preferably, the lower rail includes at least one opening, and the lower arm member includes a seat for supporting the lower rail thereon and a retractable pin to selectively engage the opening in the lower rail to thereby fix the position of the mirror subassembly along the support. The lower arm member preferably includes a forward wall and a rearward wall, with the pin extending into the lower arm through the forward wall and selectively extending through the opening in the lower rail. The rearward wall may include a detent for seating the pin therein when the pin extends through the opening to thereby support the pin.

In another aspect, the pin includes a spring mounted thereon and a pin retainer. The spring is positioned in the lower arm member between the pin retainer and the forward wall so that the spring biases the pin into engagement with the lower rail of the housing.

As will be understood, the exterior rearview mirror assembly of the present invention provides numerous advantages over prior known extendable rearview mirrors used on vehicles. The extendable rearview mirror is manually adjustable between an inboard, non-towing position and an outboard, towing position and, consequently, eliminates the need for tools. Since the extendable rearview mirror is retractable to a conventional non-towing distance from the body of the vehicle, the exterior rearview mirror assembly of the present invention can be installed at the factory and, moreover, can be retracted to a position where it does not hamper the maneuverability of the vehicle. Furthermore, the exterior rearview mirror assembly has minimal impact on the vibration of the mirror assembly.

These and other objects, advantages, purposes and features of the invention will become more apparent from the study of the following description taken in conjunction with the drawings.

DESCRIPTION OF THE PREFERRED EMBODIMENTS

Figure 1:
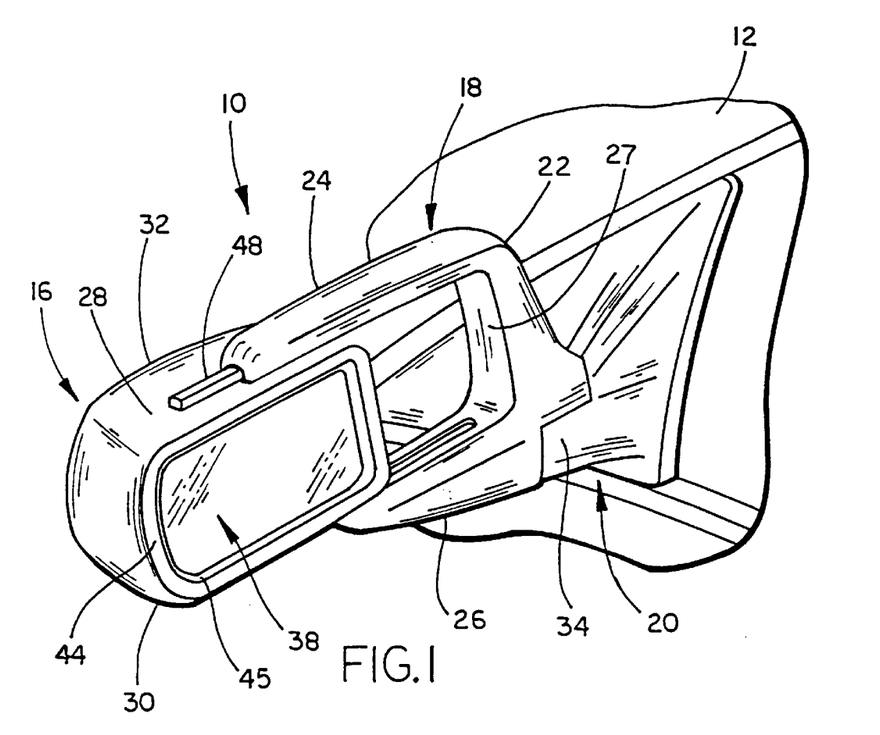
FIG. 1 is a perspective view of an exterior rearview mirror assembly of the present invention mounted on a vehicle door with the mirror subassembly in an outboard towing position.

Referring to the drawings in greater detail, FIG. 1, an exterior rearview mirror assembly 10 of the present invention, is shown mounted to a door 12 of a vehicle. Rearview mirror assembly 10 includes a mirror subassembly 16, a dual arm support 18 on which mirror subassembly 16 is supported, and a mounting bracket 20, which pivotally mounts dual arm support 18 and mirror subassembly 16 to door 12. Dual arm support 18 is pivotally mounted to a flange 34 of mounting bracket 20 on a pivot pin or bushing 36 (FIG. 2) and is preferably adapted for limited pivotal movement about pin 36 between a normal operating position and a breakaway position so that mirror subassembly and dual arm support break-away to a folded position in the event the mirror subassembly or the dual arm support strikes an object during use of the vehicle. Mounting bracket 20 is preferably mounted to door 12 by conventional methods, such as fastening by a pair of threaded studs 20a, 20b which pass through the door and are secured thereto with nuts or other fasteners.

Figure 2:
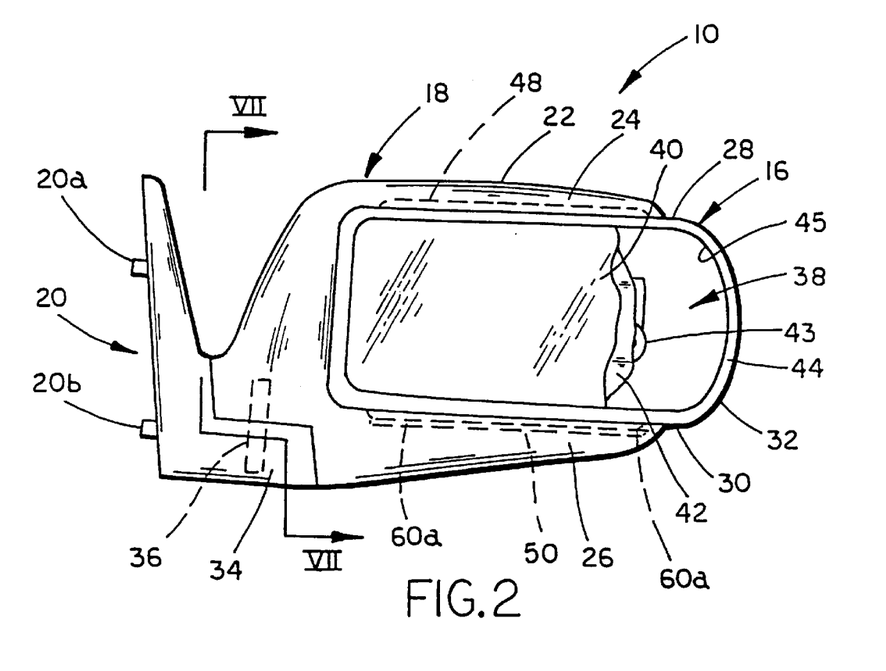
FIG. 2 is an elevational view of the exterior rearview mirror assembly of FIG. 1 taken from the rear, mirror viewing side with the mirror subassembly in an inboard, non-towing position.
Figures 3, 4:
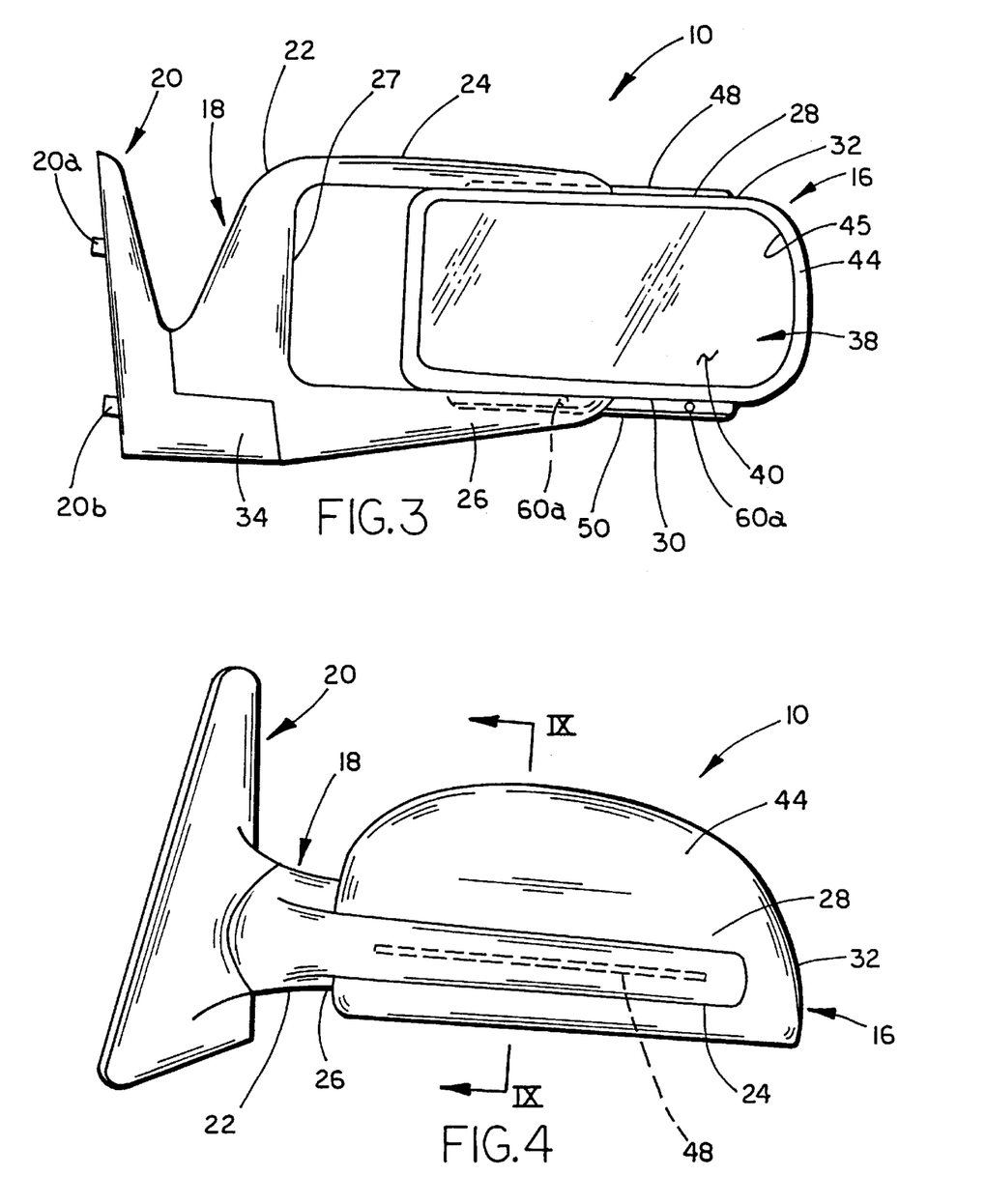
FIG. 3 is a rear elevational view of the exterior rearview mirror assembly with the mirror sub-assembly in an outboard, towing position.
FIG. 4 is a top plan view of the vehicle exterior rearview mirror.
Figure 5:
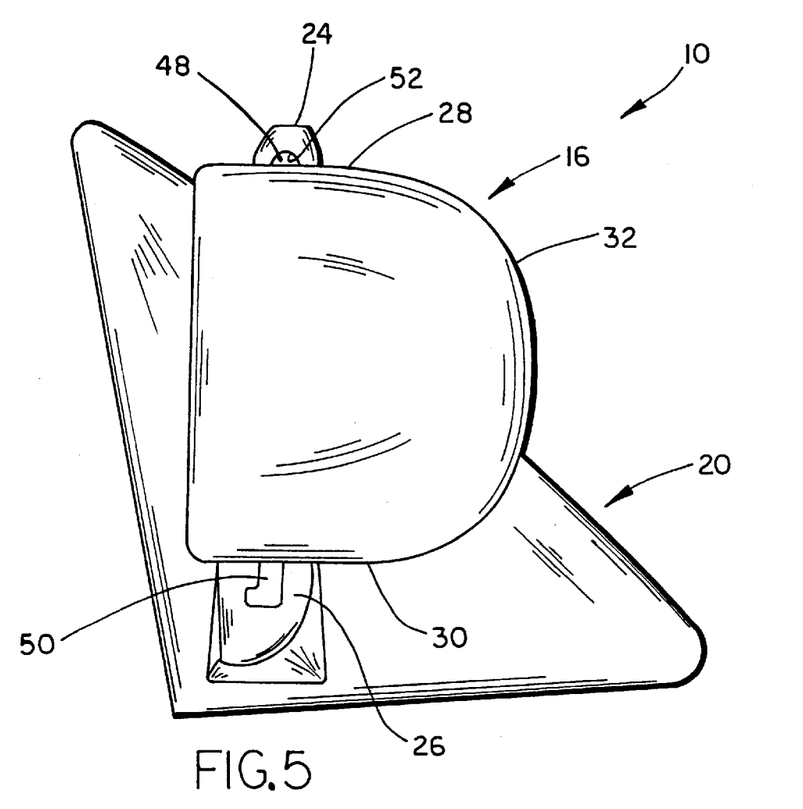
FIG. 5 is a first end elevational view of the vehicle exterior rearview mirror taken from the outboard end of the assembly.
Figure 6:
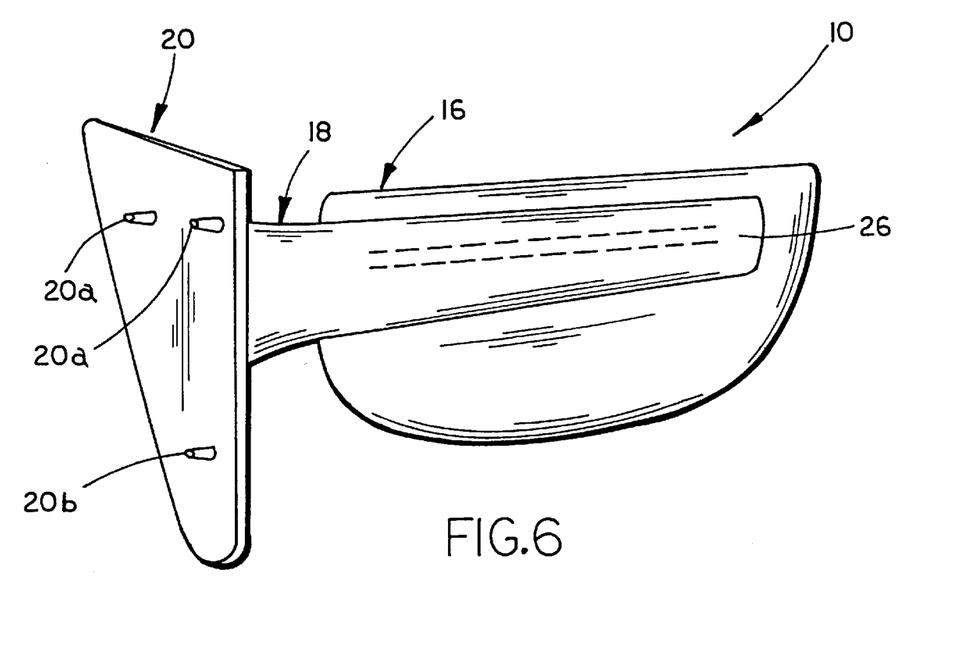
FIG. 6 is bottom plan view of the exterior rearview mirror assembly.
Figure 7:
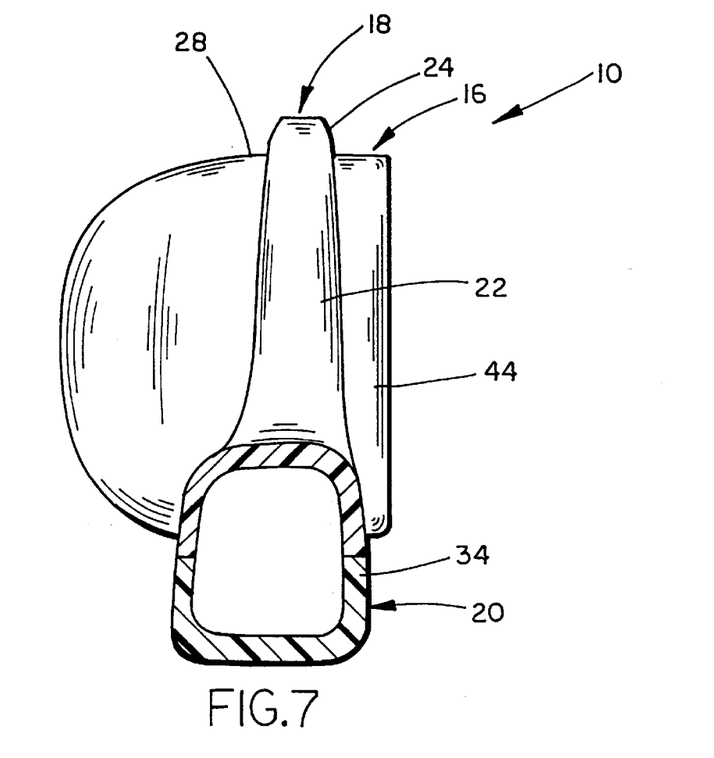
FIG. 7 is a second end elevational view of the vehicle exterior rearview mirror taken along line VII—VII of FIG. 2.
Figure 8:
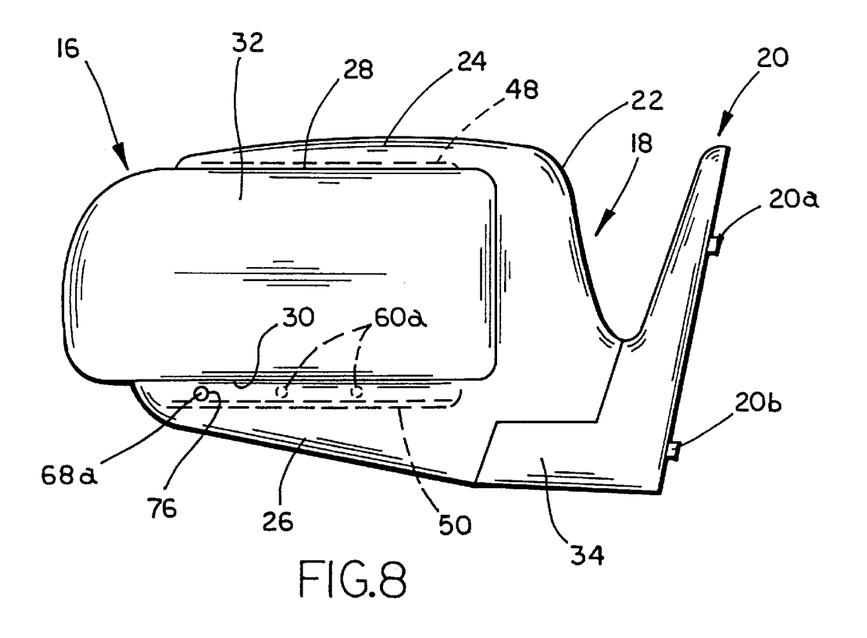
FIG. 8 is an elevational view of the mirror assembly taken from the front, non-viewing side.
Figure 9:
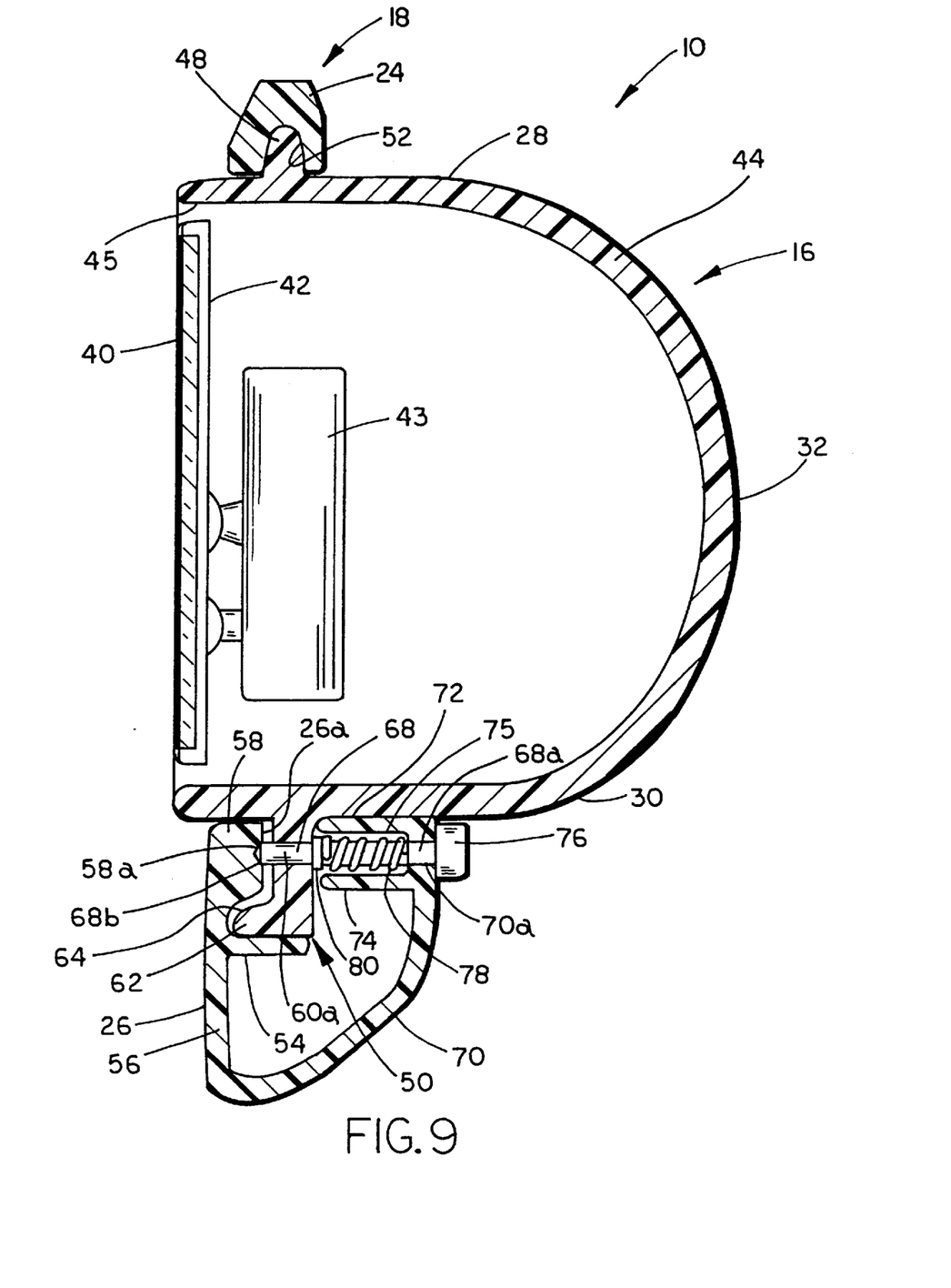
FIG. 9 is a cross-sectional view taken along line IX—IX of FIG. 4.
Figure 10:
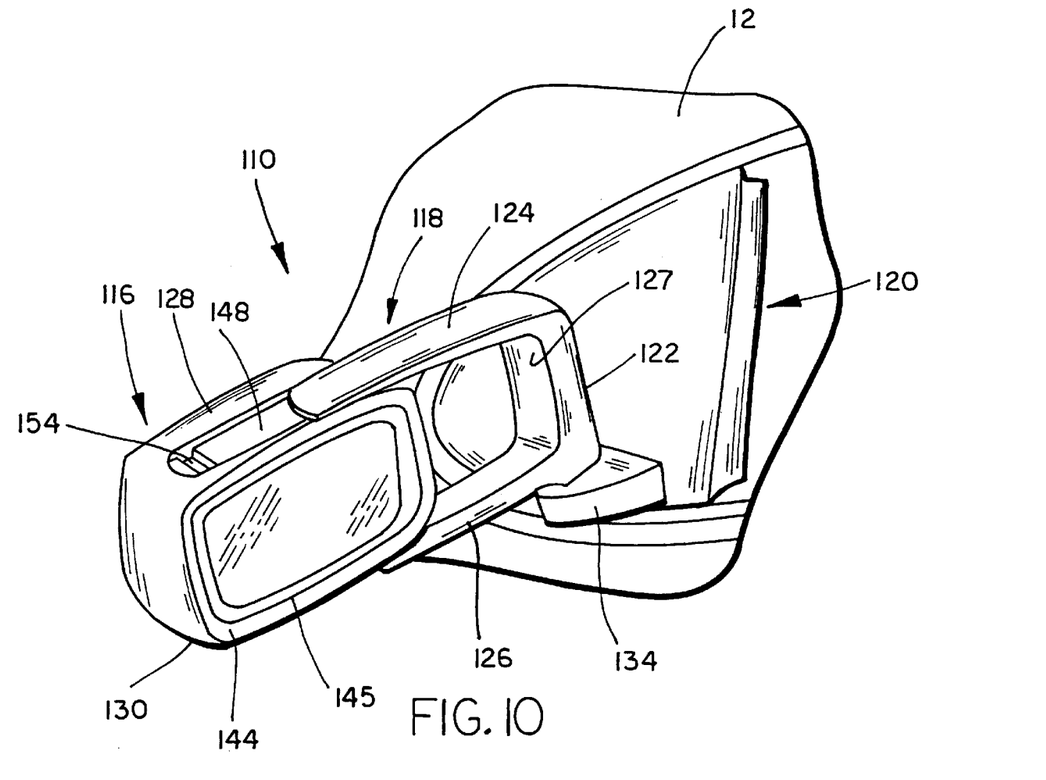
FIG. 10 is a perspective view of a second embodiment of the exterior rearview mirror assembly with the mirror subassembly in an outboard, towing position.

Mirror subassembly 16 includes a reflective element assembly 38, which is supported in mirror housing 32. As best seen in FIGS. 2 and 9, reflective element assembly 38 includes a reflective mirror element 40 and a backing plate 42. Reflective element 40 may be formed from glass or plastic, includes a reflective layer on its first or second surface, and preferably comprises a chrome coated glass member, but may comprise other conventional reflective elements. Backing plate 42 preferably mounts reflective mirror element 40 onto an electric actuator 43, which is supported by housing 32. Actuator 43 is controlled from a position remote from the mirror, such as the driver's position, to determine the position of mirror element 40 and backing plate 42. Reflective assembly 38 may also include a bezel plate or bezel assembly and may include one or more electrical components, such as described in U.S. Patent Application for MODULAR REARVIEW MIRROR ASSEMBLY INCLUDING AN ELECTRONIC CONTROL MODULE Ser. No. 08/702,228 to Roger Veldman et al, which is herein incorporated by reference in its entirety. Actuator 43 preferably comprises a conventional electric motor actuator and may comprise, for example, a two-axis positioning device that adjusts the position of the reflective mirror element 40 and the backing plate 42 about vertical and horizontal axes. Alternatively, actuator 43 may comprise a memory actuator of the type disclosed in U.S. Pat. No. 5,196,965 to Lang et al. entitled REARVIEW UNIT FOR MOTOR-VEHICLES. Further details of the mirror subassembly and its components are omitted as they may comprise one of a plurality of commercially available mirror subassemblies and mirror subassembly components. Therefore, reference is made to U.S. application Ser. No. 08/702,228 for one example of a mirror subassembly that may be used in this invention.

Referring to FIG. 9, housing 32 is generally cup-shaped and, preferably, injection molded from non-electrically conductive, material such as a suitable thermoplastic resin. As best seen in FIGS. 1–3 and 9, housing 32 preferably comprises a one piece, modular housing having an outer wall 44, a rearwardly facing central opening 45 in which reflective element assembly 38 is positioned, and a closed, forward facing surface 46 merging integrally with wall 44. Referring to FIGS. 1 and 2, dual arm support 18 comprises C-shaped mounting arm 22, which includes a pair of vertically spaced arm members 24 and 26 for engaging outer wall 44 of the mirror subassembly housing 32 and a seat 27, which is defined between arm members 24 and 26. Outer wall 44 includes an upper portion 28 and a lower portion 30, which include upper and lower elongate rails 48 and 50, respectively (FIGS. 1 and 9), which extend over at least a substantial longitudinal extent of the respective upper and lower portions 28 and 30.

Rails 48 and 50 are preferably formed from upwardly and downwardly extending flanges that are formed in one piece with, and project from, outer wall 44. As best shown in FIG. 9, arm member 24 includes an elongated groove or channel 52 forming a track which receives rail 48. Preferably, housing 32 is free to slide along in channel 52 on rail 48 so that housing 32 can be moved between an inboard, non-towing position, where mirror subassembly abuts seat 27, and an outboard, towing position (illustrated in FIGS. 1 and 3) along dual arm support 18.

On the other hand, lower arm member 26 is adapted to selectively engage lower rail 50 to limit the movement of housing 32 along dual arm support 18. As best seen in FIG. 9, lower arm is a generally U-shaped, hollow member with an elongate, upper opening 26*a* through which rail 50 extends into the interior of lower arm member 26. A flange 54 extends inwardly from a rearward wall 56 of arm 26 to provide a seat for rail 50. Furthermore, flange 54, together with an enlarged wall section 58 of rearward wall 56, provides a guide or track along which lower rail 50 slides so that housing 32 can slide along both arms 24 and 26. Lower rail 50 includes a web 60 and a flange 62, which is generally orthogonal to web 60 and extends toward the enlarged wall section 58 of arm 26. To provide a downward vertical restraint for housing 32, wall section 58 includes an elongate groove or channel 64 into which flange 62 extends to thereby hold housing 32 in a cooperative arrangement with arm 26.

While housing 32 is slidably supported on flange 54, its movement is limited by a selectively, manually actuated, retractable stop or latch 68, such as a pin, which engages lower rail 50. Stop 68 extends through an opening 70*a* provided in a forward wall 70 of lower arm 26 and through one of a plurality of positioning detents, such as a through opening 60*a*, provided in web 60 of lower rail 50 to hold and lock the position of housing 32 along dual arm support 18. The term "detent" as used in this specification is intended to be construed broadly and includes recesses, openings, projecting members, and other like positioning devices. As best seen in FIG. 9, a cylindrical shaft forming stop 68 extends through opening 70*a* in forward wall 70 between a pair of spaced apart flanges 72 and 74 that project inwardly from forward wall 70 to define a pin support or guide 75. When stop 68 is positioned to extend through an opening 60*a* of web 60, the distal end 68*b* of stop 68 is seated in a recess or detent 58*a* provided in enlarged wall section 58 of arm 26. Detent 58*a* provides support for the distal end 68*b* of stop 68 so that stop 68 will not pivot in opening 70*a*. The proximal end 68*a* of stop 68, which extends exteriorly of housing 32, preferably includes an enlarged head 76, which is provided so that stop 68 can be easily gripped for manual adjustment. Furthermore, to retain or bias stop 68 in the locking position, a helical spring 78 is positioned in pin guide 75 on pin 68, which urges stop 68 through opening 60*a* and into detent 58*a*. Preferably, stop 68 includes a spring retainer 80, such as a transverse pin or a retaining ring, to hold spring 78 between spring retainer 80 and rearward wall 70 of arm 26 between flanges 72 and 74. Thus, when stop 68 is retracted, spring retainer 80 compresses spring 78 against wall 70. When released, spring 78 urges and biases stop 68 through an aligned opening 60*a* in lower rail 50 and into detent 58*a* of enlarged wall section 58 to lock the position of mirror subassembly 16. In this manner, the normal position of stop 68 is the locked position and mirror subassembly 16 is normally fixed in position along dual arm support 18 between upper and lower arms 24 and 26.

Accordingly, lower arm member 26 provides a manually actuated, positive locking mechanism that does not have any significant amount of play and will, therefore, not significantly increase or allow vibration of the exterior mirror assembly. It should be understood from the foregoing description that housing 32 is selectively moveable along dual arm support 18 between arms 24 and 26 on rails 48 and 50 when stop 68 is retracted from openings 60*a* in rail 50 and is locked or held in a selected position between arms 24 and 26 when stop 68 is released and extends through one of the openings 60*a* and into detent 58*a*.

Lower rail 50 preferably includes at least two of the openings 60*a* so as to provide at least two fixed positions for the mirror subassembly on dual arm support 18. These positions define at least the inboard position, where housing is fully retracted between arm 24 and 26, and the outboard position, where mirror subassembly is extended from mounting bracket 20. The outboard position defines a towing position, which provides an increased, rearward field of view to the rear of the towing vehicle which includes the object being towed by the vehicle. It should be understood from the foregoing that a plurality of openings 60*a* may be provided along lower rail 50 so that mirror subassembly 16 can be held in a plurality of intermediate extended positions to accommodate towed objects of differing lengths and/or widths.

Referring to FIGS. 10–14, a second embodiment of a vehicle exterior rearview mirror assembly 110 is illustrated. Rearview mirror assembly 110 includes a mirror subassembly 116 and a dual arm support 118, which is pivotally mounted to a mounting bracket 120. Similar to mounting bracket 20, mounting bracket 120 is preferably mounted to door 12 by conventional fasteners, such as a pair of threaded studs which pass through the door and are secured thereto with nuts or other fasteners. Furthermore, dual arm support 118 is pivotally mounted to a flange 134 of mounting bracket 120 on a pivot pin or bushing 136 (FIG. 11) and is preferably adapted for limited pivotal movement about pin 136 between a normal operating position and a folded, break-away position so that mirror subassembly 116 and dual arm support 118 break-away in unison to a folded position in the event that either the mirror subassembly (116) or the dual arm support (118) strikes an object.

As best seen in FIGS. 10–13, dual arm support 118 includes a C-shaped mounting arm 122, which includes a pair of vertically spaced arm members 124 and 126 for engaging mirror subassembly 116 and a seat 127, which is defined between arm members 124 and 126. Mirror subassembly 116 includes a mirror case or housing 132, preferably molded in one piece like housing 32, and a reflective element assembly 138, which is supported in mirror housing 132. Reflective element assembly 138 includes a reflective mirror element 140 and a backing plate 142, which mounts the reflective mirror element 140 onto an actuator 143. Reflective mirror element 140 may be formed from glass or plastic and includes a reflective layer on its inwardly facing surface. Actuator 143 is supported by housing 132 and preferably is electrically operated to provide at least a single axis adjustment for reflective mirror element 140. Reference is made to housing 32, reflective element assembly 38, and actuator 43 of the previous embodiment for further details of their description since housing 132, reflective element assembly 138, and actuator 143 are of similar construction and material to their corresponding components in exterior rearview mirror assembly 10.

Housing 132 is also preferably a modular housing having an outer wall 144 and a rearward facing, central opening 145 in which reflective element assembly 138 is positioned. Outer wall 144 includes an upper wall portion 128 and a lower wall portion 130, which are respectively engaged by upper and lower arm members 124 and 126 of dual arm support 118. Upper and lower wall portions 128 and 130 include elongated, recessed grooves or tracks 148 and 150, respectively, which extend over a substantial longitudinal extent of the upper and lower wall portions 128 and 130. Grooves 148 and 150 are sized to at least partially receive arm members 124 and 126 therein so that arm members 124 and 126 do not project substantially from the housing 132. In this manner, arm members 124 and 126 appear to be an integral part of the modular housing 132 when mirror subassembly 116 is in its fully retracted position (FIG. 11), generally referred to as its inboard or non-towing position.

Figure 11:
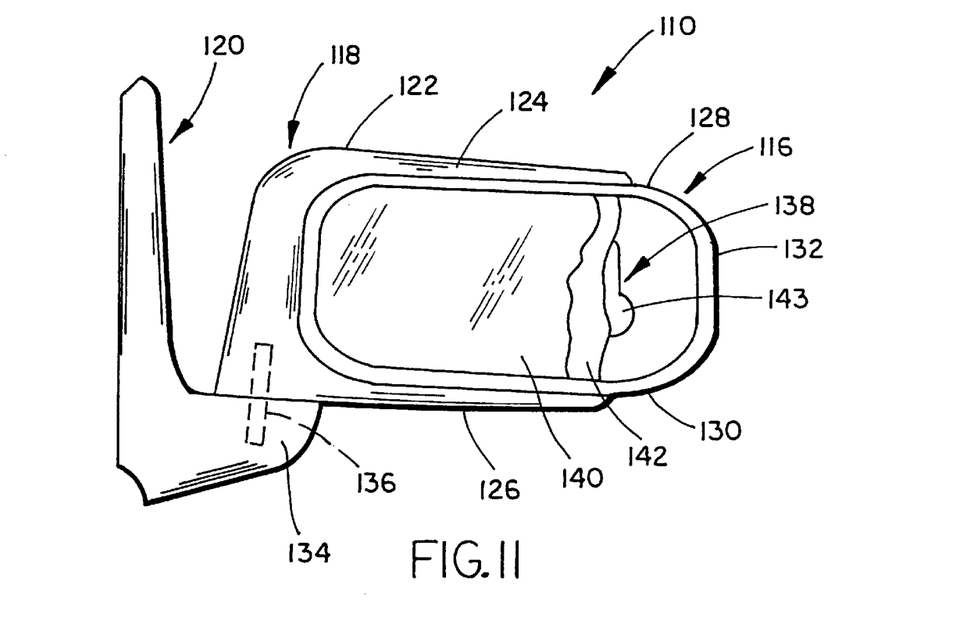
FIG. 11 is a rear elevational view of the exterior rearview mirror assembly of FIG. 10 with the mirror subassembly in an inboard, non-towing position.
Figure 12:
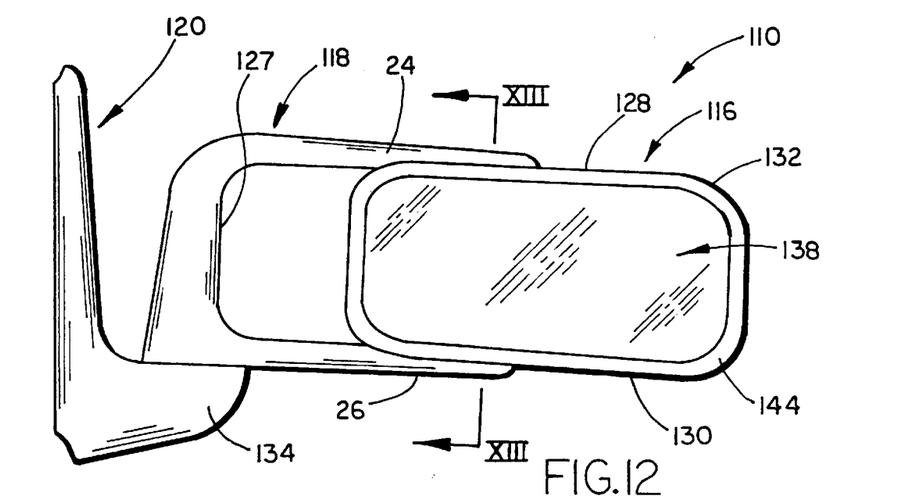
FIG. 12 is a rear elevational view of the second embodiment of the exterior rearview mirror assembly with the mirror subassembly in the outboard, towing position.
Figure 13:
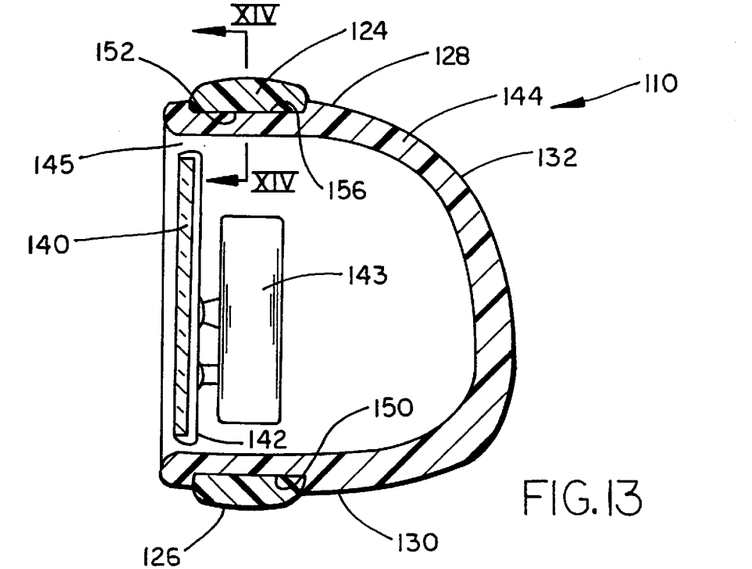
FIG. 13 is a cross-sectional view of the second embodiment of the exterior rearview mirror assembly taken along line XIII—XIII of FIG. 12.
Figure 14:
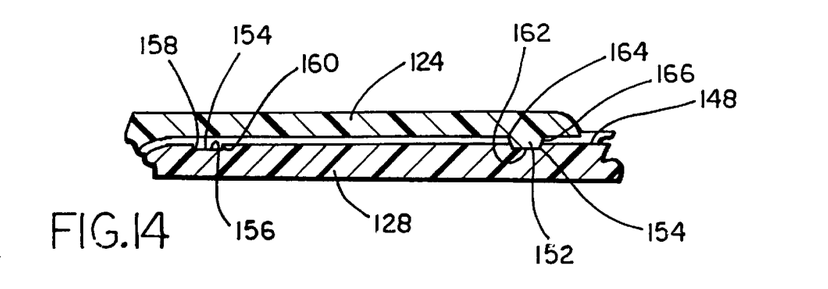
FIG. 14 is an enlarged, partial cross-sectional view taken along line XIV—XIV of FIG. 13.

As described above, arm member 124 engages mirror assembly 116 and includes an engaging or projecting member 152, such as a lug, a stop, or the like, for engaging upper wall portion 128 of housing 132. As best seen in FIG. 14, member 152 engages one of at least two positioning members 154, such as a recesses or detents, provided in upper wall portion 128 of housing 132. Preferably, recesses 154 are positioned and aligned in elongate groove 148 so that when arm member 124 slides along groove 148, projecting member 152 engages one of the recesses 154 to hold or fix the position of mirror subassembly 116 along dual arm support 118 in one of at least two positions—the inboard position and the outboard position (FIG. 13). However, the inner surface of lower arm 126 is preferably planar and slidingly engages the planar bottom surface of track 150 (FIG. 13) since arm 126 does not include a projection 152 while track 150 does not include recesses 154. Referring to FIG. 11, when mirror subassembly 116 is moved to its fully retracted or inboard position, housing 132 is fully seated between arm members 124 and 126 and abuts seat 127, which provides generally continuous support to mirror subassembly housing 132 over a substantial portion of the housing's perimeter. Moreover, when mirror subassembly 116 is in its inboard position, mounting arm 122 and housing 132 cooperate to form a modular unit with aerodynamic contours that reduce wind drag and vibration. Even when extended, the contoured surfaces of housing 132 and arm members 124 and 126 in combination with the positive locking feature of the engaging members and recesses minimize the impact on the exterior mirror assembly's vibration.

Referring to FIG. 14, each recess 154 includes a lower wall 156 and opposite side walls 158 and 160. Side walls 158 and 160 are preferably sloped to provide camming surfaces. Similarly, each projecting member 152 includes a bottom wall 162 and a pair of side walls 164 and 166. Side walls 164 and 166 are also preferably sloped so that side walls 158 or 160 guide projections 152 into engagement with recesses 154 to fully seat projections 152 in recesses 154 when manual pressure is applied to the arm member 124 to fix the position of the mirror subassembly. When fully seated, lower walls 162 of projections 152 preferably abut lower walls 156 of recesses 154. In this manner, when a sufficient pulling force is applied to mirror subassembly 116, the respective side wall (164 or 166) of projecting member 152 will cam against the respective sides wall (158 or 160) of recess 154 to disengage member 152 from recess 154. In contrast, lower arm member 126 provides a support and a guide for housing 132.

Alternately, however, lower arm 126 may also include an engaging or projecting member for engaging lower wall portion 130 of housing 132. In such case, lower wall portion 130 may similarly include at least two corresponding recesses or detents to cooperate with the engaging member of the lower arm. Preferably, if included the recesses or detents of the lower wall portion 130 are also located in groove 150 and aligned so that when projecting member 152 is seated in a recess 154, the projecting member on lower arm 126 will be similarly seated in a corresponding recess in lower wall 130.

It can be understood from the foregoing that mirror subassemblies 16 and 116 are selectively manually extendable along on their respective supports or mounting arms 18, 118 without the need for tools. Mirror subassemblies 16 and 116 can be positioned in a normal operation position close to vehicle door 12 for viewing regions near the rearward portion of the vehicle or in a towing position extended from vehicle door 12 for viewing regions rearward of a towed object. In addition, housings 32 and 132 and arms 24, 26 and 124, 126 have contoured surfaces and do not create any sharp transitions between the mirror subassembly housing and the arm members to maintain the aesthetic appearance of the rearview mirror assembly and, additionally, to minimize the impact on the aerodynamics and vibration of the exterior rearview mirror assembly.

Furthermore while several forms of the invention have been described and shown, other forms will now be apparent to those skilled in the art. For instance, stop 68 could extend through other wall sections of arm 26 to engage rail 50.

Furthermore, head 76 of stop 68 could be recessed into an enlarged dimple in rearward wall 70, which would still permit manual manipulation of stop 68 and adjustment of mirror subassembly 16. Moreover, in reference to the second embodiment of rearview exterior mirror assembly 110, the engaging or projecting member may be formed on the upper wall portion with corresponding recesses formed on the upper arm member of the dual arm support. The projection and recesses may vary in shape and complexity. For example, the projection or recesses or both may include cooperating detents to create a snap fit arrangement. The embodiments of the invention shown in the drawings are not intended to limit the scope of the invention which is defined by the claims which follow.

The embodiments of the invention in which exclusive property or privilege is claimed are defined as:

1. A vehicle exterior rearview mirror assembly comprising:
   a mirror subassembly having a housing and a reflective element supported in said housing, said housing having an upper exterior portion and a lower exterior portion;
   a bracket adapted for mounting to a vehicle; and
   a support mounting said mirror subassembly on said bracket, said support having a pair of spaced arms, each of said arms cooperating with respective said upper and lower exterior portions of said housing to releasably support said mirror subassembly, and mirror subassembly movable between two or more positions spaced at different distances from said bracket, thereby defining an inboard position and at least one outboard position for said mirror subassembly.

2. A vehicle exterior rearview mirror assembly according to claim 1, wherein at least one of said arms includes an engaging member, said engaging member cooperating with said housing to selectively hold said mirror subassembly in one of said outboard position and said inboard position.

3. A vehicle exterior rearview mirror assembly according to claim 2, wherein said engaging member comprises a stop.

4. A vehicle exterior rearview mirror assembly according to claim 3, wherein said stop comprises a retractable stop.

5. A vehicle exterior rearview mirror assembly according to claim 1, wherein said housing includes at least two positioning detents, one of said positioning detents corresponding to said inboard position, the other of said positioning detents corresponding to said outboard position, and one of said pair of arms cooperating with at least one of said positioning detents to hold said mirror subassembly in one of said inboard position and said outboard position.

6. A vehicle exterior rearview mirror assembly according to claim 5, at least one of said arms including an engaging member, said engaging member selectively engaging one of said positioning detents to releasably fix the position of said mirror subassembly in one of said outboard position and said inboard position.

7. A vehicle exterior rearview mirror assembly according to claim 6, wherein said engaging member comprises a retractable stop.

8. A vehicle exterior rearview mirror assembly according to claim 7, further comprising a spring, said spring biasing said retractable stop into engagement with one of said positioning detents when said one positioning detent is aligned with said retractable stop.

9. A vehicle exterior rearview mirror assembly according to claim 5, wherein said positioning detents include spaced openings.

10. A vehicle exterior rearview mirror assembly according to claim 9, wherein one of said arms includes a retractable pin, said retractable pin extending into one of said spaced openings to releasably fix the position of said housing along said support.

11. A vehicle exterior rearview mirror assembly according to claim 5, wherein each of said positioning detents comprises a recess.

12. A vehicle exterior rearview mirror assembly according to claim 1, said housing including a pair of rails, a first of said rails being positioned on said upper exterior portion, a second of said rails being position on said lower exterior portion, and said arms engaging said rails to slidingly hold said mirror subassembly therebetween.

13. A vehicle exterior rearview mirror assembly comprising:
   a mirror subassembly having housing and a reflective element supported in said housing, said housing including upper and lower walls and a pair of rails, a first of said rails being positioned on said upper wall, a second of said rails being positioned on said lower wall, said rail on said lower wall including a web portion and a flange portion, said flange portion extending from said web portion;
   a bracket adapted for mounting to a vehicle; and
   a support mounting said mirror sub-assembly on said bracket, said support having a pair of spaced arms, each of said arms cooperating with a different portion of said housing to releasably support said mirror sub-assembly in one of two or more positions spaced at different distances from said bracket thereby defining an inboard position and at least one outboard position for said mirror subassembly, said arms engaging said rails to slidingly hold said mirror sub-assembly therebetween, and said lower arm releasably engaging one of said web portion and said flange portion to hold said mirror subassembly in one of said inboard position and said outboard position.

14. A vehicle rearview mirror assembly according to claim 12, further comprising a retractable stop, said rail on said lower exterior portion including a positioning detent, said retractable stop releasably engaging said positioning detent to releasably fix the position of said housing along said support.

15. A vehicle exterior rearview mirror assembly according to claim 14, wherein said positioning detent includes at least two spaced openings, said stop extending through one of said spaced openings in said rail to releasably fix the position of said mirror subassembly along said support.

16. A vehicle exterior rearview mirror assembly according to claim 14, further comprising a spring, said spring urging said stop into engagement with said positioning detent to releasably fix the position of said housing along said support.

17. A vehicle exterior rearview mirror assembly according to claim 12, wherein said rail on said upper exterior portion extends into said upper arm, said rail on said lower exterior portion extending into said lower arm.

18. A vehicle exterior rearview mirror assembly according to claim 17, wherein said rail on said lower exterior portion includes at least one opening, said lower arm including a stop adapted to selectively extend into said opening to fix the position of said mirror subassembly along said support.

19. A vehicle exterior rearview mirror assembly according to claim 18, wherein said stop is biased to an extended position such that it passes through said opening.

20. A vehicle exterior rearview mirror assembly according to claim 19, wherein said lower arm includes a spring to bias said stop.

21. A vehicle exterior rearview mirror assembly according to claim 18, wherein said stop comprises a pin.

22. A vehicle exterior rearview mirror assembly according to claim 1, wherein said support is C-shaped and has upper and lower arms and a seat defined therebetween, said upper and lower arms defining said pair of spaced arms, and said housing abutting said seat when said mirror subassembly is in said inboard position and spaced from said seat when said mirror assembly is in said outboard position.

23. A vehicle exterior rearview mirror assembly according to claim 1, said support being mounted for limited pivoted movement about said mounting bracket between a normal operating position and a folded, break-away position.

24. A vehicle exterior rearview mirror assembly comprising:
- a mirror subassembly having a housing and a reflective element supported in said housing, said housing having upper and lower walls, said upper and lower walls respectively having upper and lower exterior surfaces;
- a vehicle mounting bracket adapted for mounting on a vehicle; and
- a support mounting said mirror subassembly on said mounting bracket, said support including spaced upper and lower arms engaging said upper and lower walls at said upper and lower exterior surfaces, respectively, and at least one of said arms releasably holding said mirror subassembly in one of an inboard, non-towing position spaced a first distance from said mounting bracket, and an outboard towing position spaced along said support from said mounting bracket a second distance greater than said first distance.

25. A vehicle exterior rearview mirror assembly according to claim 24, wherein said at least one arm includes an engaging member, said member engaging one of said lower wall and said upper wall to fix said mirror subassembly in one of said outboard towing position and said inboard non-towing position.

26. A vehicle exterior rearview mirror assembly according to claim 25, wherein said engaging member comprises a projecting member.

27. A vehicle exterior rearview mirror assembly according to claim 26, wherein said projecting member includes camming surfaces.

28. A vehicle exterior rearview mirror assembly according to claim 24, said housing having at least one positioning detent, said positioning detent corresponding to one of said towing position and said non-towing position, and said at least one arm engaging said positioning detent to releasably fix said mirror subassembly in one of said outboard towing position and said inboard non-towing position.

29. A vehicle exterior rearview mirror assembly according to claim 28, wherein said positioning detent comprises a recess.

30. A vehicle exterior rearview mirror assembly according to claim 29, wherein said recess includes camming surfaces so that when a pulling force is applied to said mirror subassembly, said at least one arm disengages from said recess thereby permitting said mirror subassembly to be moved along said arms.

31. A vehicle exterior rearview mirror assembly according to claim 28, wherein said at least one arm includes a projecting member, said projecting member engaging said positioning detent to releasably fix said mirror subassembly in one of said outboard towing position and said inboard non-towing position.

32. A vehicle exterior rearview mirror assembly according to claim 28, wherein said detent comprises an opening.

33. A vehicle exterior rearview mirror assembly according to claim 24, wherein said lower wall and said upper wall of said housing each include an elongated groove, said arms sliding along said elongated grooves when said mirror subassembly is moved between said outboard towing position and said inboard non-towing position.

34. A vehicle exterior rearview mirror assembly according to claim 33, at least one of said arms includes an engaging member, said housing including at least two spaced cooperating members aligned in at least one of said grooves, said engaging member selectively engaging one of said cooperating members to hold said mirror subassembly in one of said outboard towing position and said inboard non-towing position.

35. A vehicle exterior rearview mirror assembly according to claim 33, wherein said arms are at least partially seated in said elongate grooves of said housing.

36. A vehicle exterior rearview mirror assembly according to claim 34, wherein said engaging member comprises a lug.

37. A vehicle exterior rearview mirror assembly according to claim 34, wherein said cooperating members include spaced recesses.

38. A vehicle exterior rearview mirror assembly according to claim 24, wherein said support is C-shaped and has upper and lower arms and a seat defined therebetween, and said housing abutting said seat when said mirror subassembly is in said inboard non-towing position and spaced from said seat when said mirror assembly is in said outboard towing position.

39. A vehicle exterior rearview mirror assembly according to claim 24, wherein said upper arm includes a projecting lug, said housing including a pair of spaced detents in an upper wall portion of said housing, and said projecting lug engaging one of said detents to releasably fix the position of said mirror subassembly along said support in one said inboard non-towing position and said outboard towing position.

40. A vehicle exterior rearview mirror assembly comprising:
- a mirror subassembly having a housing and a reflective assembly supported by said housing, said housing being generally cup-shaped with a central opening and an outer wall, said reflective assembly being aligned with said opening, and said outer wall having upper and lower exterior surfaces, said upper and lower exterior surfaces including respective upper and lower rails;
- a vehicle mounting bracket adapted for mounting to a vehicle; and a support mounted on said vehicle mounting bracket, said support being C-shaped and having upper and lower arms, said upper rail extending into said upper arm to guide said housing along said upper arm, and said lower rail extending into and being support in said lower arm, one of said upper and lower arms releasably fixing the position of said mirror subassembly along said support in one of an inboard position and an outboard position, and said outboard position being spaced away from said bracket a greater distance than said inboard position and providing an increased field of view to the rear of the vehicle.

41. A vehicle exterior rearview mirror assembly according to claim 40, wherein said lower rail includes a lower flange, said lower arm including a track, and said lower flange being guided along said track of said lower arm when said mirror subassembly is moved along said support.

42. A vehicle exterior rearview mirror assembly according to claim 40, wherein said lower rail includes at least one opening, said lower arm member including a seat for supporting said lower rail thereon and a retractable pin selectively engaging said opening to thereby fix the position of said mirror subassembly along said support.

43. A vehicle exterior rearview mirror assembly comprising:
    a mirror subassembly having a housing and a reflective assembly supported by said housing, said housing being generally cup-shaped with a central opening and an outer wall, said reflective assembly being aligned with said opening, and said outer wall including upper and lower rails, said lower rail including at least one opening;
    a vehicle mounting bracket adapted for mounting to a vehicle; and
    a support mounted on said vehicle mounting bracket, said support being C-shaped and having upper and lower arms, said upper rail extending into said upper arm to guide said housing along said upper arm, and said lower rail extending into and being supported in said lower arm, said lower arm member including a seat for supporting said lower rail thereon and a retractable pin selectively engaging said opening to thereby releasably fix the position of said mirror subassembly along said support in one of an inboard position and an outboard position, said lower arm including a first wall and a second wall, said pin extending into said lower arm through said first wall and selectively extending through said opening in said lower rail, and said second wall including a detent for seating a distal end of said pin in said second wall when said pin extends through said opening to thereby support said pin and said outboard position being spaced away from said bracket a greater distance than said inboard position and providing an increased field of view to the rear of the vehicle.

44. A vehicle exterior rearview mirror assembly comprising:
    a mirror subassembly having a housing and a reflective assembly supported by said housing, said housing being generally cup-shaped with a central opening and an outer wall, said reflective assembly being aligned with said opening, and said outer wall including upper and lower rails, said lower rail including at least one opening;
    a vehicle mounting bracket adapted for mounting to a vehicle; and
    a support mounted on said vehicle mounting bracket, said mounting arm being C-shaped and having upper and lower arms, said upper rail extending into said upper arm to guide said housing along said upper arm, and said lower rail extending into and being supported in said lower arm, said lower arm member including a seat for supporting said lower rail thereon and a retractable pin selectively engaging said opening to thereby releasably fix the position of said mirror subassembly along said support in one of an inboard position and an outboard position, said lower rail comprising a web and a flange, said flange extending generally orthogonal to said web, and said opening being provided in said web and said outboard position being spaced away from said bracket a greater distance than said inboard position and providing an increased field of view to the rear of the vehicle.

45. A vehicle exterior rearview mirror assembly according to claim 40, said lower rail and said upper rail each extending along a substantial longitudinal extent of said housing.

46. A vehicle exterior rearview mirror assembly according to claim 40, said upper arm having a track, said upper rail extending into said track.

47. A vehicle exterior mirror assembly according to claim 40, said lower arm including an open upper side and a flange positioned below said open upper side, said lower rail extending into said lower arm through said open upper side and being seated on said flange.

48. A vehicle exterior rearview mirror assembly according to claim 40, said lower arm including first and second walls and a pin, said pin extending through one of said walls to engage said lower rail to fix the position of said mirror subassembly, and said pin having a proximate end extending exteriorly of said one wall to permit manual adjustment of said pin.

49. A vehicle exterior rearview mirror assembly comprising:
    a mirror subassembly having a housing and a reflective assembly supported by said housing, said housing being generally cup-shaped with a central opening and an outer wall, said reflective assembly being aligned with said opening, and said outer wall including upper and lower rails;
    a vehicle mounting bracket adapted for mounting to a vehicle; and
    a support mounted on said vehicle mounting bracket, said support being C-shaped and having upper and lower arms, said upper rail extending into said upper arm to guide said housing along said upper arm, and said lower rail extending into and being supported in said lower arm, one of said upper and lower arms releasably fixing the position of said mirror subassembly along said support in one of an inboard position and an outboard position, said lower arm including first and second walls and a pin, said pin extending through one of said walls to engage said lower rail to fix the position of said mirror subassembly, and said pin having a proximate end extending exteriorly of said one wall to permit manual adjustment of said pin, said lower rail having a plurality of spaced openings, and said pin extending through a selected one of said openings to fix the position of said mirror subassembly in one of a plurality of positions along said support, and said outboard position being spaced away from said bracket a greater distance than said inboard position and providing an increased field of view to the rear of the vehicle.

50. A vehicle exterior rearview mirror assembly according to claim 48, said pin having a spring mounted thereon and a pin retainer, said spring being positioned between said pin retainer and said one wall so that said pin is biased into engagement with said lower rail of said housing.

* * * * *

UNITED STATES PATENT AND TRADEMARK OFFICE
CERTIFICATE OF CORRECTION

PATENT NO. : 5,969,890          Page 1 of 1
DATED : October 19, 1999
INVENTOR(S) : Peter J. Whitehead It is certified that error appears in the above-identified patent and that said Letters Patent is hereby corrected as shown below:

Column 10, claim 12,
Line 10, "position" should be -- positioned --

Column 10, claim 13,
Line 15, insert -- a -- after "having"
Line 24, "sub-assembly" should be -- subassembly --
Line 27 and 32, "sub-assembly" should be -- subassembly --

Column 10, claim 14,
Line 37, insert -- exterior -- after "vehicle"

Column 11, claim 23,
Line 11, "pivoted" should be -- pivotal --

Column 12, claim 40,
Line 53, "support" should be -- supported --

Signed and Sealed this

Fourth day of December, 2001

*Attest:*

*Nicholas P. Godici*

NICHOLAS P. GODICI
*Attesting Officer*     *Acting Director of the United States Patent and Trademark Office*